United States Patent Office 3,094,561
Patented June 18, 1963

3,094,561
HALOCINNAMYL QUATERNARY AMMONIUM COMPOUNDS
John A. Faust and Melville Sahyun, Santa Barbara, Calif.; said Faust assignor to said Sahyun, doing business as Sahyun Laboratories, Santa Barbara, Calif.
No Drawing. Filed June 4, 1959, Ser. No. 818,018
4 Claims. (Cl. 260—567.6)

This application relates to cinnamylamines, and is more particularly concerned with halocinnamylamines and their quaternary ammonium salts.

The free base compounds of the present invention have the following structural formula:

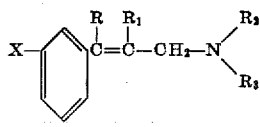

Formula I wherein X represents a single chlorine or bromine atom substituted in any available ring position i.e. o-, m-, or p-; or two chlorine or bromine atoms in the o and p position e.g. o, p-dichloro; R and $R_1$ each represent hydrogen or a lower alkyl radical; $R_2$ and $R_3$ each represent hydrogen or lower alkyl or lower alkenyl or lower alkanol. The term "lower" as used herein means radicals having from one to five carbons in the chain.

The preferred compounds of the present invention are the quaternary ammonium salts of the above depicted free bases. These salts have been shown by pharmacological tests to possess pressor activity. This indicates that they are useful for the relief of nasal congestion, for the restoration of blood pressure during surgery and for the prevention of hemorrhagic shock due to the lowering of blood pressure resulting from loss of blood.

The free base compounds of the present invention are oily liquids. They are useful as intermediates for preparing the quaternary ammonium compounds of the present invention. The quaternary ammonium salts are high-melting solids, at least slightly soluble in water.

The free bases of all of the compounds of the present invention (except those of Formula I where R is not hydrogen) can be made by the following general method of synthesis (wherein X and the various R's have the above assigned values):

Halobenzaldehyde is condensed with acetaldehyde (or with a homolog thereof, R'—$CH_2CHO$) to yield halocinnamaldehyde (or its homolog, $$X—C_6H_4—CH=C—CHO)$$
$$\phantom{X—C_6H_4—CH=C—}\overset{|}{R_1}$$

which is then reduced using aluminum isopropoxide to form halocinnamyl alcohol (or its homolog, $$X—C_6H_4—CH=C—CH_2OH)$$
$$\phantom{X—C_6H_4—CH=C—}\overset{|}{R_1}$$

which is then converted, via thionylchloride to halocinnamyl chloride (or its homolog, $$X—C_6H_4—CH=CCH_2Cl)$$
$$\phantom{X—C_6H_4—CH=}\overset{|}{R_1}$$

This latter chloride is then reacted with ammonia, (or its homolog,

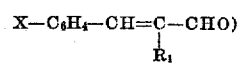

to give the free amine base halocinnamylamine (or its homolog,

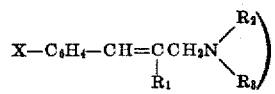

The free bases of Formula I, where R is not hydrogen but is lower alkyl instead, are made by reacting a haloacetophenone, X—$C_6H_4COCH_3$, with formaldehyde and a substituted amine to form a Mannich base,

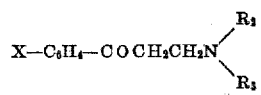

This Mannich base is then reacted with a Grignard reagent formed from a lower alkyl halide to produce a basic alcohol,

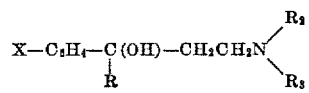

which is subsequently dehydrated by means of sulfuric acid to yield the desired cinnamylamine product,

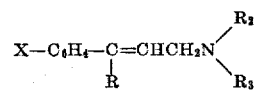

The above free bases are then converted in the known manner to quaternary ammonium salts, which salts are water-soluble, or sufficiently water-soluble to permit the salts to be dissolved in the small dosages used.

The quaternary ammonium salts of the present invention are obtained by the addition to the free base of alkyl or aralkyl esters of inorganic acids or organic sulfonic acids, including such compounds as methyl chloride, methyl bromide, methyl iodide, ethyl bromide, propyl bromide, benzyl chloride, benzyl bromide, methyl sulfate, methyl benzenesulfonate, and methyl p-toluenesulfonate, giving the methochloride, methobromide, methoiodide, ethobromide, propobromine, benzochloride, benzobromide, methosulfate, methobenzenesulfonate and metho-p-toluenesulfonate salts, respectively.

Any of the above salts can be converted into a different salt by anion exchange methods or by converting the salt to the base form and thence to the new salt.

The following examples are illustrative of the products of the present invention and of the processes by which they may be prepared, but are not to be construed as limiting:

PREPARATIONS

*Preparation 1.—o-Chlorocinnamaldehyde*

A solution of 35.2 grams (0.25 mole) of commercial o-chlorobenzaldehyde and 1.6 grams of potassium hydroxide in 50 milliliters of ethanol was stirred at 8–10 degrees centigrade while 9.0 grams (0.20 mole of acetaldehyde) was added over a period of 15 minutes. After an additional 5 minutes at 10 degrees centigrade, the mixture was acidified with glacial acetic acid and poured into water. The insoluble oil was extracted with ether, the ether solution was washed, dried over magnesium sulfate and distilled. The fraction boiling at 135–150/5 millimeters and weighing 12 grams (29 percent) solidified, and was recrystallized from heptane containing some ethanol. Melting point 49–51 degrees centigrade. (Reported, 50 degrees centigrade; Ber. 56B 1481 (1923); C.A. 17, 3329.)

*Preparation 2.—o-Chlorocinnamyl alcohol*

To a solution of 40 grams (0.2 mole) of aluminum isopropoxide in 600 milliliters of isopropyl alcohol was added 83 grams (0.5 mole) of the o-chlorocinnamaldehyde and the mixture was refluxed for 10 hours. During this time, the acetone was allowed to distill off slowly as it formed. The mixture was then vacuum-distilled to remove most of the isopropyl alcohol, and the residual oil was treated with cold, dilute sulfuric acid. The mixture was extracted with ether, the ether solution was washed with water, dried and fractionated by distillation. The fraction boiling at 130–133 degrees centigrade (0.9 millimeters) and weighing 70 grams (84 percent) was collected as the desired alcohol.

The phenylurethane, prepared from the alcohol and phenylisocyanate, melted at 70–71.5 degrees centigrade after recrystallization from heptane containing a small amount of isopropyl alcohol to increase the solubility.

*Analysis.*—Calcd. for $C_{16}H_{14}ClNO_2$: N, 4.87. Found: N, 4.64.

Preparation 3.—o-Chlorocinnamyl Chloride

A mixture of 40 milliliters (0.55 mole) of thionyl chloride, 30 milliliters of chloroform and a trace of pyridine was stirred at approximately 50 degrees centigrade while 68 grams (0.4 mole) of the o-chlorocinnamyl alcohol was added dropwise over a period of 1 hour. The mixture was then distilled to remove the excess thionyl chloride and the residue was fractionated to obtain 64 grams (85 percent) of a colorless oil, boiling point 82–96 (0.5 millimeter). Upon redistillation, the bulk of the material boiled at 90–95 degrees centigrade (0.5 millimeter).

Preparation 4.—o-Bromobenzaldehyde

This material was prepared by the bromination of o-bromotoluene and hydrolysis of the resulting o-bromobenzalbromide in the manner described for the preparation of m-bromobenzaldehyde from m-bromotoluene. (Org. Syn. Coll., Vol. II, page 89.) Yield, 80 percent, boiling point 113–118 degrees centigrade (20 millimeters). Reported boiling point 230 degrees centigrade in Beilstein VII, page 238.

Preparation 5.—o-Bromocinnamaldehyde

This compound was prepared in 26 percent yield by the condensation of o-bromobenzaldehyde and acetaldehyde in the manner described in Preparation 1 for the corresponding o-chlorocinnamaldehyde. It boiled at 100–105 degrees centigrade (1 millimeter), and melted at 67–69 degrees centigrade after recrystallization from isopropyl alcohol. The semicarbazone melted at 226–228 degrees centigrade.

Preparation 6.—o-Bromocinnamyl Alcohol

Prepared in 87 percent yield by the aluminum isopropoxide reduction of the aldehyde in the fashion described for the corresponding o-chloro compound in Preparation 2. Boiling point 117–127 degrees centigrade (0.8 millimeter).

The phenylurethane melted at 75–76 degrees centigrade after recrystallization from heptane containing a little isopropyl alcohol.

*Analysis.*—Calcd. for $C_{16}H_{14}BrNO_2$: N, 4.23. Found: N, 4.06.

Preparation 7.—o-Bromocinnamyl Chloride

A solution of 22 grams of o-bromocinnamyl alcohol (0.11 mole) in 20 milliliters of chloroform was added dropwise with stirring to 25 grams thionyl chloride (0.2 mole) dissolved in 10 milliliters of chloroform. After addition was complete the mixture was stirred 10 minutes at room temperature and then 30 minutes at 60–70 degrees centigrade. The excess thionyl chloride and chloroform were stripped under vacuum and the residue distilled twice. The main bulk of o-bromocinnamyl chloride boiled at 90–98 degrees centigrade (0.8 millimeter) and weighed 19 grams (75 percent).

Preparation 8.—p-Chlorocinnamaldehyde

This compound was prepared by the condensation of commercial p-chlorobenzaldehyde and acetaldehyde by the process described in Preparation 1 for the isomeric o-chloro compound. The yield of material boiling at 120–140 degrees centigrade (1 millimeter) was 39 percent. It melted at 61–62 degrees centigrade, after recrystallization from ether-petroleum ether. (This compound is repoted in Beilstein VII (1st Supp.), page 190, where the melting point is given as 62–62.5 degrees centigrade.)

Preparation 9.—p-Chlorocinnamyl Alcohol

This compound was prepared by the aluminum isopropoxide reduction of the aldehyde in the manner described for the isomeric o-chloro compound in Preparation 2. It was obtained in 55 percent yield; boiling point 130–140 degrees centigrade (1.7 millimeters); melting point 55–56 degrees centigrade after recrystallization from heptane. (Reported melting point 57–58 degrees centigrade in Beilstein VI (1st. Supp.), page 528.)

Preparation 10.—p-Chlorocinnamyl Chloride

Nine grams (0.053 mole) of the p-chlorocinnamyl alcohol was dissolved in 25 milliliters of chloroform, the solution was cooled and 30 grams of thionyl chloride was added dropwise. After the reaction mixture had remained overnight at room temperature it was distilled to yield 5 grams (50 percent) of the chloride, boiling point 103–105 degrees centigrade (1.5 millimeters).

Preparation 11.—p-Bromocinnamaldehyde

By following the procedure of Preparation 1, this compound is prepared by the condensation of p-bromobenzaldehyde and acetaldehyde.

Preparation 12.—p-Bromocinnamyl Alcohol

By following the procedure of Preparation 2, this compound is prepared by the aluminum isopropoxide reduction of p-bromocinnamaldehyde.

Preparation 13.—p-Bromocinnamyl Chloride

By following the procedure of Example 3, this compound is prepared by heating p-bromocinnamyl alcohol with thionyl chloride and chloroform.

Preparation 14.—m-Chlorocinnamaldehyde

Commercial m-chlorobenzaldehyde (35 grams; 0.25 mole) was dissolved in a solution of 1.6 grams of potassium hydroxide in 50 milliliters of ethanol. The solution was stirred at 10 degrees centigrade, and 9 grams (0.2 mole) of acetaldehyde was added over a period of 20 minutes. After the mixture had stirred at 10 degrees centigrade for an additional 10 minutes, it was acidified by the addition of glacial acetic acid. Water was then added and the insoluble oil was extracted with ether. The ether solution was washed with water, dried and distilled to yield 10 grams (30 percent), boiling point 120–130 degrees centigrade (1 millimeter).

Preparation 15.—m-Chlorocinnamyl Alcohol

Eleven grams (0.066 mole) of the m-chlorocinnamaldehyde was reduced with aluminum isopropoxide in the manner described for the corresponding o-chloro analogue in Preparation 2. Yield 10 grams (91 percent); boiling point 115–130 degrees centigrade (1 millimeter).

Preparation 16.—m-Chlorocinnamyl Chloride

Ten grams (0.059 mole) of the m-chlorocinnamyl alcohol dissolved in 20 milliliters of chloroform, was added to a cooled solution of 25 milliliters of thionyl chloride in 20 milliliters of chloroform. The mixture was allowed to warm to room temperature and then distilled. Yield 8.9 grams (80 percent), boiling point 85–95 degrees centigrade (1 millimeter).

Preparation 17.—m-Bromocinnamaldehyde

By following the procedure of Preparation 14, this compound is prepared by condensing m-bromobenzaldehyde with acetaldehyde.

Preparation 18.—m-Bromocinnamyl Alcohol

By following the procedure of Preparation 15, this compound is prepared by the aluminum isopropoxide reduction of m-bromocinnamaldehyde.

Preparation 19.—m-Bromocinnamyl Chloride

By following the procedure of Preparation 16, this compound is prepared by reacting m-bromocinnamyl alcohol with thionyl chloride in chloroform.

Preparation 20.—p-Chloro-Alpha-Methylcinnamaldehyde

A solution containing 4 grams of potassium hydroxide and 70 grams (0.5 mole) of commercial p-chlorobenzaldehyde in 250 milliliters of ethanol was stirred at 22–25 degrees centigrade while a solution of 26 grams (0.45 mole) of propionaldehyde in 50 milliliters of ethanol was added over a period of 30 minutes. After the mixture had been stirred for an additional 15 minutes at 20 degrees it was acidfied with glacial acetic acid and distilled to remove most of the alcohol. The residue was treated with water and extracted with ether, the ether solution was washed with dilute sodium hydroxide solution, dried and fractionated through a nine-inch Vigreux column. The fraction boiling at 112–117 degrees centigrade (1 millimeter) and weighing 41 grams (50 percent) was collected as the desired product. The distillate solidified completely and melted at 43–44 degrees centigrade after recrystallization from a mixture of heptane and isopropyl alcohol.

The semicarbazone, prepared in dilute ethanol and recrystallized from isopropyl alcohol, melted at 219–220 degrees centigrade.

In a similar manner the isomeric o-chloro and m-chloro-compounds, and the analogous o-bromo, m-bromo and p-bromo-alpha-methylcinnamaldehydes are prepared by varying the starting halobenzaldehyde. And the halo-alpha-alkylcinnamaldehydes are prepared by replacing the propionaldehyde, with a homolog thereo, R—$CH_2$CHO wherein R represents the particular alkyl desired in the final product e.g. ethyl, propyl, butyl, pentyl, etc.

Preparation 21.—3-(p-Chlorophenyl)-2-Methyl-2-Propen-1-Ol

A mixture of 40 grams (0.22 mole) of the p-chloro-alpha-methylcinnamaldehyde, 10 grams of aluminum isopropoxide and 500 milliliters of isopropyl alcohol was refluxed for 16 hours under conditions which permitted the slow distillation of the acetone as it was formed. The alcohol was removed, the residue was treated with dilute sulfuric acid and extracted with ether. The ether solution was washed, dried and distilled to yield 37 grams (92 percent) of the alcohol, boiling point 110–120 degrees centigrade (0.5 millimeters). It melted at 65–67 degrees centigrade after recrystallization from a mixture of heptane and isopropyl alcohol.

The phenylurethane, prepared from the alcohol and phenylisocyanate, melted at 108–109 degrees centigrade after recrystallization from heptane isopropyl alcohol.

Analysis.—Calcd. for $C_{17}H_{16}ClNO_2$: N, 4.64. Found: N, 4.67.

In a similar manner the isomeric and analogous o-chloro-m-chloro, o-bromo, m-bromo, and p-bromo 3-(halophenyl)-2-alkyl-2-propen-1-ol compounds are prepared by using the proper starting material from Preparation 20.

Preparation 22.—p-Chlorophenyl-Beta-Dimethylaminoethyl Ketone Hydrochloride

A mixture of 77 grams (0.5 mole) of commercial p-chloro-acetophenone, 19.8 grams of paraformaldehyde, 59 grams (0.72 mole) of dimethylamine hydrochloride, 1 milliliter of 36 percent aqueous hydrochloric acid and 80 milliliters of ethanol was refluxed for 4 hours. The solution was diluted with 400 milliliters of acetone and cooled. The solid which separated was isolated, washed with acetone and dried. Yield 90 grams (73 percent), melting point 175–177 degrees centigrade after recrystallization from isopropyl alcohol. This compound is reported to melt at 170 degrees centigrade (C.A., 39, 2067).

Analysis.—Calcd. for $C_{11}H_{14}ClNO·HCl$: $Cl^-$, 14.29. Found: $Cl^-$, 14.14.

In a similar manner the isomer and analogues o-chloro-m-chloro, o-bromo, m-bromo, and p-bromophenyl-beta-dimethylaminoethyl ketone hydrochlorides are prepared by replacing the p-chloroacetophenone with the haloacetophenone corresponding to the desired end product. And by replacing the dimethylamine hydrochloride with

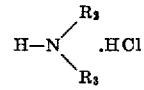

wherein $R_2$ and $R_3$ each represent hydrogen or lower-alkyl or lower-alkenyl, the end product produced will contain the amine grouping

in place of —$N(CH_3)_2$.

Preparation 23.—p-Chloro-Alpha-(2-Dimethylaminoethyl)-Alpha-Methyl Benzyl Alcohol Hydrochloride An aqueous solution of 90 grams (0.36 mole) of the p-chlorophenyl-beta-dimethylaminoethyl ketone hydrochloride was made alkaline and extracted with benzene. The benzene solution of the resultant base was dried thoroughly over magnesium sulfate and then added, over a period of 30 minutes, to a Grignard reagent prepared from 71 grams (0.5 mole) of methyl iodide, 12 grams (0.5 gram at.) of magnesium and 400 milliliters of ether. The mixture was refluxed for 1 hour and distilled to remove the ether. Dilute hydrochloric acid was added to the solution, and the mixture was stirred to decompose the complex. The mixture was filtered to remove 28 grams of solid, melting point 157–159 degrees centigrade after recrystallization from ethanol. Analysis of this material indicated that it is probably the methoiodide of the desired compound.

The acidic aqueous layer of the filtrate was made alkaline with ammonium hydroxide, and the liberated base was extracted with ether.

Distillation of the dried ether solution yielded 21.4 grams, boiling point 110–126 degrees centigrade (1 millimeter). Upon redistillation there was obtained 14.4 grams of p-chloro-alpha-(2-dimethylamino-ethyl)-alpha-methyl benzyl alcohol, boiling point 115–119 degrees centigrade (0.9 millimeter).

Analysis.—Calcd. for $C_{12}H_{18}ClNO$: N, 6.15; Neut. Equiv. 228. Found: N, 5.88; Neut Equiv. 241.

The hydrochloride was obtained by contacting the above free base with hydrogen chloride in the conventional manner. It melted at 182–184 degrees centigrade after recrystallization from ethanol-ether.

Analysis.—Calcd. for $C_{12}H_{18}ClNO·HCl$: N, 5.30; $Cl^-$, 13.42. Found: N, 517; $Cl^-$, 13.16.

In a similar manner, isomeric, analogous and homologous

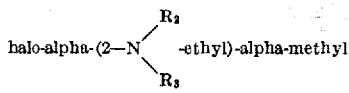

benzyl alcohol hydrochlorides are prepared by using the proper starting ketone hydrochloride from Preparation 22. And the compounds wherein the alpha-methyl is replaced by alpha-alkyl are prepared by replacing the methyl Grignard reagent with an alkyl Grignard reagent.

*Preparation 24.—2,4-Dichlorocinnamaldehyde*

A solution of 0.5 gram of potassium hydroxide and 22 grams (0.125 mole) of commercial 2,4-dichlorobenzaldehyde in 200 milliliters of ethanol was stirred at 15 degrees centigrade while a solution of 4.4 grams (0.1 mole) of acetaldehyde in 50 milliliters of ethanol was added during a 15 minute period. After standing overnight at 8–10 degrees centigrade, the mixture was acidified with glacial acetic acid and distilled to remove most of the alcohol. The residual solution was distilled at 1–2 millimeters and the fraction (15 grams) boiling at 80–160 degrees centigrade was refractionated to yield 9.2 grams of recovered 2,4-dichlorobenzaldehyde, boiling point 83–110 (0.9 millimeter), and 4.6 grams of the cinnamaldehyde, boiling point 120–130 degrees (0.9 millimeter), melting point 107–108 degrees centigrade after recrystallization from heptane.

*Preparation 25.—2,4-dichlorocinnamyl Alcohol*

A solution consisting of 10 grams (0.05 mole) of the 2,4-dichlorocinnamaldehyde and 4 grams (0.02 mole) of aluminum isopropoxide in 300 milliliters of isopropyl alcohol was refluxed for 16 hours. The acetone was distilled slowly from the mixture as it was formed. The solution was vacuum-distilled to remove the isopropyl alcohol, and the residue was treated with dilute sulfuric acid. The mixture was then extracted with ether, the ether solution was washed, dried over magnesium sulfate and distilled. The fraction boiling at 128–135 degrees centigrade (1 millimeter) amounted to 6.6 grams (65 percent) was taken as the desired alcohol.

The phenylurethane, prepared from the alcohol and phenylisocyanate, melted at 88–90 degrees centigrade after recrystallization from a heptane isopropyl alcohol mixture.

*Analysis.*—Calcd. for $C_{16}H_{13}Cl_2NO_2$: N, 4.35. Found: N, 4.01.

In a similar manner the 2, 4-dibromocinnamyl alcohol and homologues of the dichloro and dibromo compounds may be prepared by varying Preparations 24 and 25 to use the proper dihalobenzaldehyde and acetaldehyde homolog.

EXAMPLES

*Example 1.—o-Chloro-N,N-Dimethylcinnamylamine Hydrochloride*

Ten grams (0.053 mole) of o-chlorocinnamyl chloride was added dropwise to 75 milliliters of aqueous dimethylamine solution at room temperature with stirring. There was a moderate exothermic reaction and, after the mixture had stirred for an additional hour at 25 degrees centigrade, it was vacuum-distilled to remove most of the excess dimethylamine. The residue was added to iced hydrochloric acid and the mixture was extracted with ether. The acidic aqueous solution was then made akaline, the liberated oily amine base was extracted with ether, the ether was washed, dried and distilled. Yield of o-chlor-N,N-dimethylcinnamylamine was 6.2 grams (60 percent); boiling point 95–97 (0.6 millimeters).

*Analysis.*—Calcd. for $C_{11}H_{14}ClN$: Neut. Equiv., 196; N, 7.16. Found: Neut. Equiv., 201; N, 6.95.

The hydrochloride salt was prepared from 3 grams of the above base by the addition of excess ethereal hydrogen chloride and was recrystallized from ethanol-ether. Yield, 2.8 grams (79 percent); melting point 167–168 degrees centigrade. The salt was in the form of white platelets and is very soluble in water.

*Analysis.*—Calcd. for $C_{11}H_{14}ClN \cdot HCl$: N, 6.04; Cl⁻, 15.28. Found: N, 5.96; Cl⁻, 15.10.

Other desired acid addition salts are prepared by substituting the proper acid for hydrogen chloride.

*Example 2.—o-Chloro-N,N-Dimethylcinnamylamine Methobromide*

A solution of 3 grams (0.0153 mole) of o-chloro-N,N-dimethylcinnamylamine in 25 milliliters of dry ether was treated with 3 grams (0.032 mole) of methyl bromide, and the mixture was allowed to remain at room temperature overnight. The solid which had separated was isolated and recrystallized from a mixture of ethanol and ether. Yield, 3 grams (67 percent), melting point 193–194 degrees centigrade. The compound is obtained in the form of white crystals, which are soluble to the extent of greater than 30 percent in water.

*Analysis.*—Calcd. for $C_{11}H_{14}ClN \cdot CH_3Br$: N, 4.82; Br⁻, 27.50. Found: N, 4.86; Br⁻, 27.77.

Other desired quaternary ammonium salts are prepared by substituting the proper salt for methyl bromide.

*Example 3.—o-Bromo-N,N-Dimethylcinnamylamine*

About 75 milliliters of 25 percent aqueous dimethylamine solution was placed in a glass pressure bottle together with 125 milliliters of ethanol and 19 grams (0.08 mole) of o-bromocinnamyl chloride. The bottle was sealed and the one-phase solution heated at 95–100 degrees centigrade for 3 hours. The excess dimethylamine and alcohol were removed under vacuum and the residue acidified with hydrochloric acid. The aqueous solution was extracted with ether and then rendered alkaline with sodium hydroxide. The liberated base was extracted with ether. Some insoluble material (2 grams) was present so the two layers were filtered, and the ether solution of the base was water-washed, dried and distilled. A total of 13.7 grams of material, boiling point 70–103 degrees centigrade (0.6 millimeter) was obtained from the first distillation. On redistillation, 9.0 grams (47 percent) of o-bromo-N,N-dimethylcinnamyl-amine, boiling point 93–94 degrees centigrade (0.8 millimeter) was obtained.

*Analysis.*—Calcd. for $C_{11}H_{14}BrN$: N, 5.84; Neut. Equiv., 240. Found: N, 5.69; Neut. Equiv., 245.

*Example 4.—o-Bromo-N,N-Dimethylcinnamylamine Methobromide*

A solution of 3 grams methyl bromide and 3 grams o-bromo-N,N-dimethylcinnamylamine in 25 milliliters dry ether was allowed to stand for one hour. The white solid formed was filtered off and washed with dry ether. After recrystallization from an alcohol-ether mixture, 2.3 grams of material, melting point 201–202 degrees centigrade was obtained. The compound is obtained as a while crystalline solid, having a solubility greater than 30 percent in water.

*Analysis.*—Calcd. for $C_{11}H_{14}BrN \cdot CH_2Br$: N, 4.18; Br⁻, 23.85. Found: N, 4.28; Br⁻, 23.81.

*Example 5.—o-Bromo-N,N-Dimethylcinnamylamine Hydrochloride*

A dry ether solution of 3 grams of o-bromo-N,N-dimethylcinnamylamine was treated with ethereal hydrogen chloride. The solid which formed was isolated and recrystallized from a mixture of ethanol-ether to yield 1.9 grams of material, melting point 176–177 degrees centigrade. The compound was obtained in the form of a white powder, which is more than 30 percent soluble in water.

*Analysis.*—Calcd. for $C_{11}H_{14}BrN \cdot HCl$: N, 5.06; Cl⁻, 12.82. Found: N, 4.99; Cl⁻, 13.02.

*Example 6.—o-Bromo-N-Isopropylcinnamylamine Hydrochloride*

A mixture of 6 grams (0.026 mole) of o-bromocinnamyl chloride 10 grams (0.17 mole) of isopropyl amine and 25 milliliters of xylene was refluxed for one hour. Dilute hydrochloric acid was added to the cooled mixture and the layers were separated. The aqueous solution was made alkaline with solium hydroxide, the liberated amine base was extracted with ether and the ether extract was washed, dried and distilled. Yield of o-bromo-N-isopropyl-cinnamylamine was 4.2 grams (64 percent), boiling point 110–120 degrees centigrade (0.8 millimeter).

*Analysis.*—Calcd. for $C_{12}H_{15}BrN$: Neut. Equiv., 254; N, 5.51. Found: Neut. Equiv., 261; N, 5.47.

The hydrochloride, prepared in ether and recrystallized from ethanol, melted at 215–216 degrees centigrade. It is a while crystalline solid, about 1.4 percent soluble in water.

*Analysis.*—Calcd. for $C_{12}H_{15}BrN.HCl$: N, 4.82; Cl⁻, 12.20. Found: N, 4.53; Cl⁻, 12.18.

*Example 7.—o-Bromo-N-(2-Hydroxyethyl) Cinnamylamine Hydrochloride*

A mixture of 6 grams (0.026 mole) of o-bromocinnamyl chloride and 40 milliliters of monoethanolamine was heated at 150 degrees centigrade for 0.5 hour, after which it was vacuum-distilled to remove some of the excess monoethanolamine. The residue was dissolved in dilute hydrochloric acid and the solution was extracted with ether. The aqueous solution was then made alkaline and the liberated base was extracted with ether and distilled. Yield, 4.6 grams (74 percent); boiling point 140–150 degrees centigrade (0.8 millimeter).

*Analysis.*—Calcd. for $C_{11}H_{14}BrNO$: N, 5.47. Found: N, 5.43.

The hydrochloride melted at 142–143 degrees centigrade after recrystallization from ethanol-ether. It was obtained as white platelets which were more than 20 percent soluble in water.

*Analysis.*—Calcd. for $C_{11}H_{14}BrNO.HCl$: N, 4.79; Cl⁻, 12.12. Found: N, 4.62; Cl⁻, 12.13.

*Example 8.—p-Chloro-N,N-Dimethylcinnamylamine Hydrochloride*

A mixture of 10 grams (0.053 mole) of p-chlorocinnamyl chloride, 30 milliliters of 40 percent aqueous dimethylamine and 10 milliliters of ethanol was heated in a pressure bottle for 2 hours at 95–100 degrees centigrade. The alcohol and excess dimethylamine were removed by distillation, the residue was treated with dilute hydrochloric acid, and the mixture was extracted with ether to remove the insoluble material. The aqueous solution was made akaline, the oily amine base was extracted with ether, and the dried ether solution was distilled to yield 7.2 grams (69 percent), boiling point 95–103 degrees centigrade (1.5 millimeters).

*Analysis.*—Calcd. for $C_{11}H_{14}ClN$: Neut. Equiv., 196; N, 7.17. Found: Neut. Equiv., 199; N, 7.09.

The hydrochloride was prepared from the base and ethereal hydrogen chloride, and was recrystallized from ethanol. It melted at 231 degrees centigrade with decomposition. It is a white, crystalline solid and is very soluble in water.

*Analysis.*—Calcd. for $C_{11}H_{14}ClN$: N, 6.04; Cl⁻, 15.28. Found: N, 5.76; Cl⁻, 15.29.

*Example 9.—p-Chloro-N,N-Dimethylcinnamylamine Methobromide*

A solution of 3 grams (0.015 mole) of p-chloro-N,N-dimethylcinnamylamine base, in 25 milliliters of dry ether was treated with 3 grams (0.032 mole) of methyl bromide at room temperature. An exothermic reaction occurred, and the solid quaternary salt which formed was isolated and recrystallized from ethanol-ether. Yield, 1.2 grams (35 percent); melting point 166–167 degrees centigrade. It is a white, crystalline solid more than 30 percent soluble in water.

*Analysis.*—Calcd. for $C_{11}H_{14}ClN.CH_3Br$: N, 4.82; Br⁻, 27.50. Found: N, 4.92; Br⁻, 27.52.

*Example 10.—p-Chloro-N-Isopropylcinnamylamine Hydrochloride*

A mixture of 10 grams (0.053 mole) of p-chlorocinnamyl chloride, 30 milliliters of isopropyl amine and 50 milliliters of xylene was refluxed for 2 hours. The cooled mixture was poured into dilute hydrochloric acid, and filtered to remove the solid amine hydrochloride. The aqueous layer of the filtrate was combined with the solid amine hydrochloride and the mixture was made alkaline with sodium hydroxide. The oil which separated was extracted with ether, the ether solution was washed, dried and distilled to yield 6 grams (54 percent) of the amine base, p-chloro-N-isopropylcinnamylamine, boiling point 111–113 (1 millimeter).

*Analysis.*—Calcd. for $C_{12}H_{16}ClN$: Neut. Equiv., 209; N, 6.68. Found: Neut. Equiv., 216; N, 6.34.

The hydrochloride, prepared from the above base and ethereal hydrogen chloride, melted at 216 degrees centigrade (dec.) after recrystallization from isopropyl alcohol. It was obtained in the form of white platelets, which are 2 percent soluble in water.

*Analysis.*—Calcd. for $C_{12}H_{16}ClN.HCl$: N, 5.69; Cl⁻, 14.40. Found: N, 5.62; Cl⁻, 14.54.

*Example 11.—p-Chloro-N-Isopropylcinnamylamine Ethobromide*

By following the procedure of Example 9, p-chloro-N-isopropylcinnamylamine is treated with ethyl bromide, and the ethobromide salt is obtained as a white solid.

*Example 12.—p-Chloro-N-Pentylcinnamylamine Sulfate*

By following the procedure of Example 10, p-chlorocinnamyl chloride is reacted with pentylamine to yield p-chloro-N-pentylcinnamylamine.

The above free base is then contacted with ethereal sulfuric acid to yield the sulfate acid addition salt.

*Example 13.—p-Bromo-N,N-Dimethylcinnamylamine and Salts*

By following the procedure of Example 8, but starting with p-bromocinnamyl chloride, the base p-bromo-N,N-dimethylcinnamylamine is obtained, and is then contacted with ethereal hydrogen chloride to yield the hydrochloride salt as a white solid. By contacting the above base with benzyl chloride in dry ether, the benzochloride quaternary ammonium salt is obtained.

*Example 14.—m-Chloro-N,N-Dimethylcinnamylamine Hydrochloride*

A mixture of 8.9 grams (0.047 mole) of m-chlorocinnamyl chloride, 100 milliliters of 40 percent aqueous dimethylamine solution and 15 milliliters of ethanol was heated in a pressure bottle for 2 hours at 95–100 degrees centigrade. The mixture was distilled to remove the excess dimethylamine, and the residue was taken up in dilute hydrochloric acid. After the insoluble material had been extracted with ether, the aqueous solution was made alkaline, and the liberated oily base was extracted with ether. The ether solution was washed with water, dried and distilled to yield 6 grams (60 percent) of the desired amine, m-chloro-N,N-dimethylcinnamylamine, boiling point 110–120 degrees centigrade (1 millimeter).

*Analysis.*—Calcd. for $C_{11}H_{14}ClN$: Neut. Equiv. 197. Found: Neut. Equiv. 205.

The hydrochloride, prepared from the base and ethereal hydrogen chloride, melted at 206–208 degrees centigrade after recrystallization from ethanol, and was in the form of white platelets more than 30 percent soluble in water.

*Analysis.*—Calcd. for $C_{11}H_{14}ClN$: N, 6.04; Cl⁻, 15.28. Found: N, 5.04; Cl⁻, 15.17.

*Example 15.—m-Chloro-N,N-Dimethylcinnamylamine Methobromide*

A solution of 2.1 grams of m-chloro-N,N-dimethylcinnamylamine in ether was treated with 2 grams of methyl bromide, and the solution was allowed to remain at room temperature overnight. The semi-solid quaternary salt was isolated and recrystallized from ethanol-ether. Yield, 1 gram; melting point 179–180 degrees centigrade. The salt was in the form of a white crystalline solid, which was over 30 percent soluble in water.

Analysis.—Calcd. for $C_{11}H_{14}ClN.CH_3Br$: N, 4.82. Found: N, 4.80.

*Example 16.—m-Bromo-N,N-Dimethylcinnamylamine and Salts*

By following the procedure of Example 14, but starting with m-bromocinnamyl chloride, m-bromo-N,N-dimethylcinnamylamine and its hydrochloride salt is prepared. Then using the above base and following the procedure of Example 15 the methobromide salt is prepared.

*Example 17.—o-Chloro-N-Iisopropylcinnamylamine Hydrochloride*

A mixture of 10 grams (0.053 mole) of o-chlorocinnamyl chloride, 20 grams (0.34 mole) of mono-isopropylamine and 25 milliliters of xylene was refluxed for 2 hours. Dilute hydrochloric acid was added to the cooled solution, and the mixture was filtered to remove the solid hydrochloride which had separated. The aqueous layer of the filtrate was combined with the solid hydrochloride, the suspension was made alkaline, and the liberated oily base was extracted with ether. The ether solution was washed, dried and distilled to obtain 7.2 grams (65 percent) of the o-chloro-N-isopropylcinnamylamine base as a colorless liquid boiling at 110–111 degrees centigrade (1 millimeter).

Analysis.—Calcd. for $C_{12}H_{16}ClN$: Neut. Equiv., 210; N, 6.68. Found: Neut. Equiv., 214; N, 6.46.

The o-chloro-N-isopropylcinnamylamine hydrochloride was prepared from 7 grams (0.033 mole) of the base and ethereal hydrogen chloride and was recrystallized from a mixture of dimethylformamide and isopropyl alcohol. Yield, 7.3 grams (90 percent); melting point 200–202 degrees centigrade.

Analysis.—Calcd. for $C_{12}H_{16}ClN.HCl$: N, 5.69; Cl⁻, 14.40. Found: N, 5.61; Cl⁻, 14.32.

In a similar manner the isomeric p-chloro,-m-chloro and analogous o-, p- and m-bromo compounds can be prepared by starting with the proper halocinnamyl chloride. And from the free base, any desired quaternary ammonium or acid addition salt can be prepared as described heretofore.

*Example 18.—o-Chloro-N-Butylcinnamylamine Hydrochloride*

This compound was prepared by the method described in Example 17 for the analogous N-isopropyl derivative using 10 grams (0.053 mole) of o-chlorocinnamyl chloride, 20 grams (0.27 mole) of n-butyl amine and 50 milliliters of xylene. The base was a colorless liquid, boiling point 124–128 degrees centigrade (0.5 millimeter). Yield of o-chloro-N-butylcinnamylamine was 8.1 grams (68 percent).

Analysis.—Calcd. for $C_{13}H_{18}ClN$: Neut. Equiv., 224; N, 6.26. Found: Neut. Equiv., 225; N, 5.91.

The hydrochloride was prepared from 7.8 grams (0.035 mole) of the base and ethereal hydrogen chloride, and was recrystallized from isopropyl alcohol-ether. Yield, 6 grams (66 percent); melting point 186–187 degrees centigrade.

Analysis.—Calcd. for $C_{13}H_{18}ClN.HCl$: N, 5.38; Cl⁻, 13.63. Found: N, 5.04; Cl⁻, 13.54.

The isomeric and analogous halo compounds are prepared in similar manner as mentioned in Example 17.

*Example 19.—o-Chloro-N,N-Diethylcinnamylamine Hydrochloride*

A mixture of 10 grams (0.053 mole) of o-chlorocinnamyl chloride, 20 grams (0.27 mole) of diethylamine and 50 milliliters of xylene was refluxed for 2 hours. Dilute hydrochloric acid was added to the cooled solution and the layers were separated. The aqueous layer was made alkaline, the liberated oily base was extracted with ether, the ether solution was washed, dried and distilled. Yield of o-chloro-N,N-diethylcinnamylamine was 10 grams (84 percent); boiling point 118–122 degrees centigrade (1 millimeter).

Analysis.—Calcd. for $C_{13}H_{18}ClN$: Neut. Equiv., 224; N, 6.26. Found: Neut. Equiv., 222; N, 6.23.

The hydrochloride was prepared in 87 percent yield from the base and ethereal hydrogen chloride. Melting point 170–172 degrees centigrade after recrystallization from isopropyl alcohol-ether.

Analysis.—Calcd. for $C_{13}H_{18}ClN.HCl$: N, 5.38; Cl⁻, 13.63. Found: N, 5.41; Cl⁻, 13.58.

The metho-p-toluenesulfonate is prepared by contacting the base with methyl p-toluenesulfonate.

The isomeric and analogous chloro and bromo compounds are prepared in similar fashion starting with the proper halocinnamyl chloride.

*Example 20.—o-Chloro-N,N-Diethylcinnamylamine Methobromide*

To a solution of 6 grams (0.027 mole) of o-chloro-N,N-diethylcinnamylamine in 25 milliliters of ether was added 5 grams of methyl bromide, and the mixture was allowed to remain at room temperature for 6 hours. The solid was isolated and recrystallized from isopropyl alcohol-ether to yield 6.2 grams (77 percent) of the white, crystalline quaternary salt, melting point 150–152 degrees centigrade.

Analysis.—Calcd. for $C_{13}H_{18}ClN.CH_3Br$: N, 4.40; Br⁻, 25.08. Found: N, 4.45; Br⁻, 24.83.

*Example 21.—o-Chloro-N-Allylcinnamylamine Hydrochloride* o-Chloro-N-allylcinnamylamine was prepared in the manner described in Example 19 for the corresponding N,N-diethyl compound using 10 grams (0.053 mole) of o-chlorocinnamyl chloride, 20 grams, (0.35 mole) of allyl amine and 50 milliliters of xylene. Yield of base, 8 grams (69 percent); boiling point 118–123 degrees centigrade (1 millimeter).

Analysis.—Calcd. for $C_{12}H_{14}ClN$: Neut. Equiv., 208. Found: Neut. Equiv., 209.

The hydrochloride was prepared in 62 percent yield from the base and ethereal hydrogen chloride, and was recrystallized from isopropyl alcohol-ether. Melting point 153–155 degrees centigrade.

Analysis.—Calcd. for $C_{12}H_{14}ClN.HCl$: Cl⁻, 14.52. Found: Cl⁻, 14.82.

*Example 22.—o-Chloro-N-Methylcinnamylamine Hydrochloride* o-Chlorocinnamyl chloride (10 grams, 0.053 mole) was combined with 100 milliliters of 40 percent aqueous methylamine. The mixture was warmed and sufficient ethanol was added to dissolve the chloride. The resulting solution, contained in a pressure bottle was heated at 95–100 degrees centigrade for 2 hours and was then distilled to remove the alcohol and excess amine. The residue was treated with dilute hydrochloric acid and extracted with ether to remove the insoluble material. The aqueous solution was made alkaline, the liberated base was extracted with ether and the ether solution was washed, dried and distilled. Yield of o-chloro-N-methylcinnamylamine 4.5 grams (47 percent); boiling point 85–92 degrees centigrade (0.4 millimeter).

Analysis.—Calcd. for $C_{10}H_{12}ClN$: Neut. Equiv., 182; N, 7.71. Found: Neut. Equiv., 185; N, 7.21.

The hydrochloride was prepared from the base and ethereal hydrogen chloride, and was recrystallized from isopropyl alcohol-ether Melting point 141–143 degrees centigrade.

Analysis.—Calcd. for $C_{10}H_{12}ClN.HCl$: N, 6.42; Cl⁻, 16.26. Found: N, 6.47; Cl⁻, 16.03.

The methoiodide salt is prepared by contacting the free base with methyl iodide.

Example 23.—p-Chloro-2-Methyl-N,N-Dimethylcinnamylamine Hydrochloride

A solution of 10 grams (0.055 mole) of the alcohol 3-(p-chlorophenyl)-2-methyl-2-propen-1-ol, in 15 milliliters of chloroform was gradually added to a solution of 5 milliliters of thionyl chloride in 10 milliliters of chloroform. After 14 hours at room temperature, the chloroform and excess thionyl chloride were removed under reduced pressure leaving the 3-(p-chlorophenyl)-2-methyl-2-propen-1-chloride as an oil. The chloride (10 grams) was combined with 50 milliliters of 25 percent aqueous dimethylamine and 75 milliliters of ethanol, and the mixture was heated in a pressure bottle for 2 hours at 95–100 degrees centigrade. The mixture was distilled to remove the excess dimethylamine and dilute hydrochloric acid was added to the residue. The insoluble material was extracted with ether, the aqueous solution was made alkaline, and the liberated oily amine base was extracted with ether. The ether solution was washed with water, dried and distilled to yield 8.5 grams (74 percent) of product, p-chloro-2-methyl-N,N-dimethylcinnamylamine, boiling point 90–95 degrees centigrade (0.5 millimeter).

The hydrochloride, prepared from the base and ethereal hydrogen chloride, melted at 201–203 degrees centigrade after recrystallization from isopropyl alcohol.

Analysis.—Calcd. for $C_{12}H_{16}ClN.HCl$: N, 5.69; Cl⁻, 14.40. Found: N, 5.51; Cl⁻, 14.33.

Example 24.—o-Chloro-2-Methyl-N,N-Dimethylcinnamylamine Methobromide

An ether solution of 4 grams of p-chloro-2-methyl-N,N-dimethylcinnamylamine was treated with 4 grams of methyl bromide. After 3 hours at room temperature the solid which separated was isolated and recrystallized from isopropyl alcohol-ether. Yield 3.4 grams, melting point 200–202 degrees centigrade.

Analysis.—Calcd. for $C_{12}H_{16}ClN.CH_3Br$: N, 4.60. Found: N, 4.62.

By following the procedures of Examples 23 and 24, but by starting with the isomeric and analogous halo-substituted starting materials, the isomeric and analogous halo-substituted acid addition and quaternary ammonium salts are prepared. And by replacing the dimethylamine of Example 23, with a homologous amine e.g. methylethylamine, dipropylamine, ethylbutylamine, etc., correspondingly homologous final products are prepared. And by replacing the 3-(halophenyl)-2-methyl-2-propen-1-ol of Example 23 with 3-(halophenyl)-2-alkyl-2-propen-1-ol, wherein the alkyl is ethyl, propyl isopropyl, butyl, pentyl, etc., the correspondingly homologous end products are prepared.

Example 25.—p-Chloro-3-Methyl-N,N-Dimethylcinnamylamine Hydrochloride

Ten grams of the base of the amino alcohol, p-chloro-alpha-(2-dimethylaminoethyl)-alpha-methyl benzyl alcohol was added dropwise and with stirring and cooling to 40 milliliters of 96 percent sulfuric acid. The mixture was stirred at room temperature for 10 minutes and was then poured onto ice. The solution was made alkaline and the insoluble oil was extracted with ether. The ether solution was washed with water, dried and distilled to yield 1.4 grams of an oil boiling at 100–108 degrees centigrade (0.5 millimeter). The hydrochloride, prepared from the base and hydrogen chloride in ether, melted at 177–178 degrees centigrade after two recrystallizations from isopropyl alcohol-ether.

Analysis. — Calcd. for $C_{12}H_{16}ClN.HCl$: N, 5.69. Found: N, 5.72.

By starting with the homologous amino alcohol, wherein in place of 3-methyl, there is a 3-lower alkyl, the correspondingly homogolgous final product is obtained. And by varying the halogen substituent on the starting amino alcohol, the correspondingly halo-substituted isomer or analog of the final products are obtained. The quaternary ammonium salts are prepared from the free base as previously described.

Example 26.—2,4-Dichloro-N,N-Dimethylcinnamylamine and Salts

To a solution of 6 grams (0.026 mole) of 2,4-dichlorocinnamyl alcohol in 25 milliliters of chloroform there was added slowly 5 grams of thionyl chloride. The solution was then refluxed for 1 hour and vacuum-distilled to removed the excess thionyl chloride and chloroform. The residual oil, consisting of 2,4-dichlorocinnamyl chloride was then combined with 25 milliliters of 25 percent aqueous dimethylamine and 40 milliliters of ethanol in a pressure bottle. The mixture was heated at 95–100 degrees centigrade for 12 hours, after which it was distilled to remove the alcohol and excess dimethylamine. The residue was taken up in dilute hydrochloric acid and the insoluble material was removed by an ether extraction. The aqueous solution was made alkaline, the liberated amine base was extracted with ether, the ether solution was washed with water, dried and fractionated. The amine, weighing 3 grams boiled at 95–100 degrees centigrade (0.7 millimeter).

The hydrochloride obtained by contacting the above base, 2,4-dichloro-N,N-dimethylcinnamylamine with ethereal hydrogen chloride, melted at 210–211 degrees centigrade after recrystallization from isopropyl alcohol-ether.

Analysis.—Calcd. for $C_{11}H_{13}Cl_2N.HCl$: Cl⁻, 13.30. Found: Cl⁻, 13.45.

The methobromide was obtained as a crystalline solid by the interaction of the base and excess methyl bromide at room temperature. After recrystallization from isopropyl alcohol it melted at 199–201 degrees centigrade.

Analysis.—Calcd. for $C_{11}H_{13}Cl_2N.CH_3Br$: N, 4.31; Br⁻, 24.59. Found: N, 4.28; Br⁻, 24.82.

In a similar manner by starting with the analogous bromo starting material, 2,4-dibromo-N,N-dimethylcinnamylamine, and its salts are prepared.

Example 27.—o-Chlorocinnamylamine and Salts Thereof

A solution of 8 grams (0.042 mole) of o-chlorocinnamyl chloride in 50 milliliters of ethanol was saturated with ammonia and heated, in a pressure vessel, at 95 degrees centigrade for 3 hours. The alcohol was removed by distillation, and the residue was mixed with dilute hydrochloric acid and ether. The ether layer was discarded; the aqueous layer, which contained some solid amine hydrochloride, was made alkaline and extratced with ether. The ether solution was washed with water, dried and distilled to yield 2.1 grams (30 percent) of the primary amine base, o-chlorocinnamylamine, boiling point 86–95 degrees (1 millimeter).

The hydrochloride prepared in ether solution and recrystallized from isopropyl alcohol-ether was obtained as white crystalline solid, melting point 211–213 degrees centigrade (dec.) with preliminary darkening and shrinking at about 190 degrees.

Analysis.—Calcd. for $C_9H_{10}ClN.HCl$: N, 6.86; Cl⁻, 17.37. Found: N, 6.58; Cl⁻, 17.03.

The propobromide salt of o-chlorocinnamylamine is prepared by the interaction of the base and excess propyl bromide and obtained as a crystalline solid.

In a similar manner, by starting with the m-chloro, p-chloro, o-, p- or m-bromocinnamyl chloride, the correspondingly halo substituted halocinnamylamines and salts are prepared.

In addition to the previously discussed utility, several of the compounds have proved to have special properties: thus o-chloro- and o-bromo-N,N-dimethylcinnamylamine methobromide appear to possess the equivalent degree of pressor potency as epinephrine, with however only one-hundredth the tachycardia side effect of epinephrine. Also the pressor effect of these compounds persists in spite of adrenergic blockade by such agents as "Regitine"

which completely abolish the pressor activity of epinephrine.

It is to be understood that the invention is not to be limited to the exact compounds shown and described, as obvious modifications and equivalents will be apparent to one skilled in the art, and the invention is therefore to be limited only by the scope of the appended claims.

We claim:
1. Compounds having the formula:

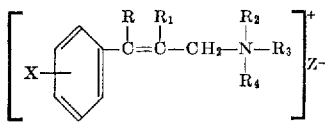

wherein X represents an atom selected from the group consisting of chlorine and bromine; R and $R_1$ are each selected from the group consisting of hydrogen and lower-alkyl; $R_2$ and $R_3$ are each selected from the group consisting of hydrogen, lower alkyl, lower alkenyl and lower alkanol; $R_4$ is lower-alkyl; and Z is a non-toxic anion.

2. o-Chloro - N,N - dimethylcinnamylamine methobromide.
3. o-Bromo - N,N - dimethylcinnamylamine methobromide.
4. o-Chloro-N,N-diethylcinnamylamine methobromide.

References Cited in the file of this patent
UNITED STATES PATENTS

| | | |
|---|---|---|
| 2,595,372 | Shelton | May 6, 1952 |
| 2,601,275 | Gump et al. | June 24, 1952 |
| 2,609,393 | Crosley | Sept. 2, 1952 |
| 2,686,808 | Sprague | Aug. 17, 1954 |

OTHER REFERENCES

Benoit et al.: Chem. Abstracts, vol. 33 (1939), 6259 (1 page).

Frejka: C. A., vol. 47, p. 2131d (1953).

Shapiro et al.: J.A.C.S., vol. 81, p. 3728–3736 (1959).

Schmidle et al.: J.A.C.S., volume 77, pp. 4636–4638 (1955).

UNITED STATES PATENT OFFICE
CERTIFICATE OF CORRECTION

Patent No. 3,094,561　　　　　　　　　　　　　　　　June 18, 1963

John A. Faust et al.

It is hereby certified that error appears in the above numbered patent requiring correction and that the said Letters Patent should read as corrected below.

Column 6, line 65, for "517" read -- 5.17 --; column 8, line 49, and column 9, line 9, for "while", each occurrence, read -- white --; column 14, line 15, for "12 hours" read -- 2 hours --.

Signed and sealed this 14th day of January 1964.

(SEAL)
Attest:

ERNEST W. SWIDER

Attesting Officer

EDWIN L. REYNOLDS

Acting Commissioner of Patents